United States Patent Office 3,592,784
Patented July 13, 1971

3,592,784
CROSS-LINKABLE POLYMER COMPOSITIONS
Karl Brack, Wilmington, Del., assignor to Hercules Incorporated, Wilmington, Del.
No Drawing. Filed Aug. 3, 1967, Ser. No. 658,060
Int. Cl. C08f 47/10; C08g 53/10
U.S. Cl. 260—2.5
2 Claims

ABSTRACT OF THE DISCLOSURE

A cross-linkable polymer composition is obtained by admixing an unsaturated polymer, a polyfunctional hydrazide halide of a specified formula, and material that provides upon contact with water at least one alkaline reactant that reacts with the hydrazide halide to form the corresponding polyfunctional nitrile imine which in turn cross-links the unsaturated polymer.

---

This invention relates to cross-linkable polymer compositions useful as sealants, adhesives, coatings, etc., and to a process of cross-linking said compositions. More particularly, this invention relates to cross-linkable unsaturated polymer compositions which cross-link on exposure to moisture.

In the past, it has been known to prepare sealant, adhesive and coating formulations by merely dissolving a polymer in a volatile solvent. Such formulations, while acceptable for many applications, suffer serious drawbacks. For example, such formulations are subject to shrinkage due to the evaporation of the solvent. Another disadvantage is the susceptibility of the resulting uncrosslinked product to attack by solvents. Still other sealants and adhesive formulations are based on cross-linkable two component systems. In such formulations two reactive components are admixed just before application. One of the disadvantages of this type of formulation is the fact that it must all be used in a short time period before it cures to an unworkable mass.

Now in accordance with this invention, it has unexpectedly been found that compositions can be prepared which have good shelf life, but which will cross-link at normal room temperature (20–25° C.) to solid insoluble products when exposed to moisture, such as atmospheric moisture. Since the compositions can be prepared without using any solvents, there is no shrinkage upon curing. A typical composition of this invention comprises an unsaturated polymer, a polyfunctional hydrazide halide and a latent base.

Any unsaturated polymer containing ethylenic unsaturation wherein there is at least one hydrogen radical attached to at least one of the carbon atoms of the ethylenic double bond can be used in the compositions of this invention. Where fluidized compositions are desired, unsaturated polymers having a molecular weight range of from about 1000 to about 20,000 are preferred. However, higher molecular weight polymers can be used in conjunction with small amounts of solvents and/or plasticizers to obtain the desired fluidity. Typical unsaturated polymers that can be used are polybutadiene-1,2; polybutadiene-1,4; styrene-butadiene copolymers; isobutylene-isoprene copolymers; natural rubber; polyester resins such as, for example, maleate-fumarate-containing polyesters and polyacrylate esters; butadiene-acrylonitrile copolymers; ethylene-propylene-dicyclopentadiene terpolymers; polychloroprene; polyisoprene; unsaturated alkyd resins such as tall oil alkyd resins; polyether copolymers and terpolymers containing at least two unsaturated epoxide constituents such as propylene oxide-allyl glycidyl ether copolymers, ethylene oxide-epichlorohydrin-allyl glycidyl ether terpolymers; polyunsaturated polyethers obtained by converting polyether polyols to the corresponding vinyl ethers, allyl ethers, acrylates, undecylenates, allylurethanes, and the like; polyether polyol-arylene-polyisocyanate copolymers with terminal allyl, isopropenyl, methallyl urethane and the like end groups, such as, for example, a copolymer represented by the formula:

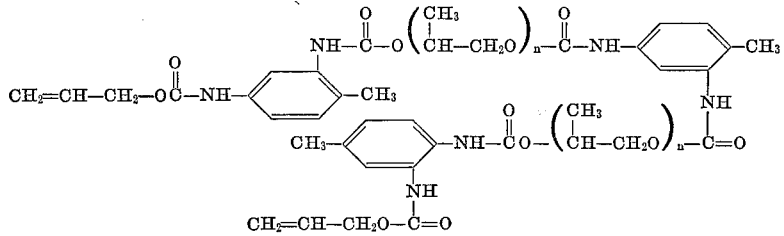

polyester polyol-arylene polyisocyanate copolymers with allyl and similar urethane end groups; and the like; and blends of these polymers with each other. In some cases it may be desirable to use partially hydrogenated products of the above unsaturated polymers.

The polyfunctional hydrazide halide of this invention is a compound having the formula selected from the group consisting of

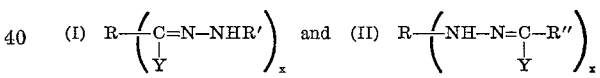

wherein R is an organic radical having a valence greater than 1, generally 2–10 and preferably 2–6, R' is selected from the group consisting of the hydrogen and monovalent hydrocarbon radicals, R" is a monovalent hydrocarbon radical, Y is a halide radical, and $x$ is an integer equal to the valence of R.

Generally R is selected from the group consisting of the hydrocarbon, halide substituted hydrocarbon, hydrocarbon-oxy-hydrocarbon, hydrocarbon-thio-hydrocarbon and hydrocarbon-sulfonyl-hydrocarbon polyvalent radicals. In preferred embodiments of this invention R is a divalent hydrocarbon radical selected from the group consisting of alkylene radicals such as, for example, methylene, dimethylene, trimethylene, tetramethylene, pentamethylene, hexamethylene, dodecamethylene, octamethylene, octadecamethylene and the like; arylene radicals such as, for example, o-, m- and p-phenylene, biphenylene, naphthylene, and the like; cycloalkylene radicals such as, for example, cyclohexylene, cyclooctylene, cyclopentylene, cyclobutylene, and the like; arylene-dialkylene radicals such as o-, m- and p-xylene and o-, m- and p-phenylene-diethylene, and the like; alkylene-diarylene radicals such as, for example, methylene bis(o-, m- or p-phenyl), dimethylene bis(o-, m- or p-phenyl), and the like; and cycloalkylene-dialkylene radicals such as 1,2-, 1,3-, and 1,4-cyclohexane-dimethylene, 1,2- and 1,3-cyclopentane-dimethylene, and the like.

Generally, the monovalent hydrocarbon radicals in the group from which R' is selected and which R" independently of R' encompasses comprise alkyl radicals preferably containing 1-20 carbon atoms, such as, for example, methyl, butyl, nonyl, decyl, pentadecyl, and the like; cycloalkyl radicals such as, for example, cyclopentyl, cyclohexyl, cyclooctyl, cyclododecyl, and the like; aryl radicals preferably having 1-3 rings, such as, for example, phenyl, biphenyl, naphthyl, and the like; and alkaryl radicals preferably having one or more $C_1$-$C_{20}$ alkyl groups and 1-3 rings in the aryl group, and aralkyl radicals such as, for example, benzyl, naphthylhexamethylene, and the like.

The halide radical which is Y encompasses the fluoride, chloride, bromide and iodide radicals.

Exemplary of the polyfunctional hydrazide halides of this invention containing two functional hydrazide halide groups are bis(hydrazide chloride) such as, for instance, isophthaloyl-bis(phenylhydrazide chloride),
terephthaloyl-bis(phenylhydrazide chloride),
isophthaloyl-bis(methylhydrazide chloride),
isophthaloyl-bis(ethylhydrazide chloride),
terephthaloyl-bis(methylhydrazide chloride),
succinoyl-bis(phenylhydrazide chloride),
adipoyl-bis(methylhydrazide chloride),
p-phenylene dipropionyl-bis(methylhydrazide chloride),
tetramethylene dibenzoyl-bis(butylhydrazide chloride),
N,N'-p-phenylene-bis(benzoyl hydrazide chloride),
N,N'-m-phenylene-bis(benzoyl hydrazide chloride),
glutaryl-bis(phenylhydrazide chloride),
1,4-cyclohexane dicarboxyl-bis(phenylhydrazide chloride), and the like including the corresponding hydrazide fluorides, bromides and iodides.

Exemplary of polyfunctional hydrazide halides of this invention containing more than two functional hydrazide halide groups are polyfunctional hydrazide chlorides such as, for instance, trimesoyl-tris(phenylhydrazide chloride),
trimesoyl-tris(methylhydrazide chloride),
trimesoyl-tris(ethylhydrazide chloride),
trimellitoyl-tris(phenylhydrazide chloride),
trimellitoyl-tris(methylhydrazide chloride),
pyromellitoyl-tetrakis(butylhydrazide chloride),
benzenepentacarboxyl-pentakis(phenylhydrazide chloride),
mellitoyl-hexakis(phenylhydrazide chloride), and the like including the corresponding hydrazide fluorides, bromides and iodides.

The polyfunctional hydrazide halides of this invention are readily made. For instance, the bis(hydrazide chlorides) of this invention are made by the reaction of phosphorous pentachloride with the corresponding acyl or aroyl hydrazides obtained by the reaction of carboxylic acid chlorides with appropriately substituted hydrazines.

This reaction route is illustrated by the following equations:

R(COCl)$_x$ + xH$_2$NNHR' ⟶ R(CONHNHR')$_x$ + xHCl
R(CONHNHR')$_x$ + xPCl$_5$ ⟶

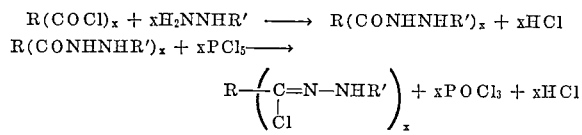

In these equations R, R', and x have the same significances as in Formulas I and II.

A latent base is material which in the absence of water and heat is inert relative to the polyfunctional hydrazide halide of this invention, but which provides upon contact with water alkaline substance that reacts with said polyfunctional hydrazide halide to form the corresponding polyfunctional nitrile imine.

In some embodiments the latent base comprises at least one compound which in the absence of water is inert to the polyfunctional hydrazide halide, but in contact with water becomes basic to the extent it extracts hydrogen halide from the polyfunctional hydrazide halide so as to form the corresponding polyfunctional nitrile imine. In other embodiments it comprises more than one such compound. Typical compounds of this kind are aluminum carbide, alkaline earth metal oxides and carbonates such as, for example, magnesium carbonate, calcium oxide, calcium carbonate, strontium oxide, barium oxide, barium carbonate, etc.; and the metal nitrides which on contact with water form metal hydroxides and ammonia, example of such nitrides being calcium nitride, magnesium nitride, etc. Some of the above-mentioned compounds generate a gas such as methane or carbon dioxide when reacted with water, thus causing foaming of the composition and resulting in cellular products. The reaction of a non-foaming latent base compound such as barium oxide is exemplified by the following equations:

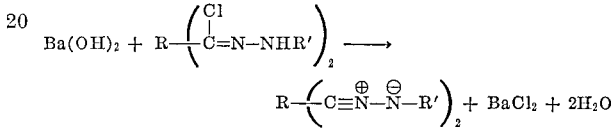

The reaction of a foaming latent base compound such as aluminum carbide is illustrated by the following equations:

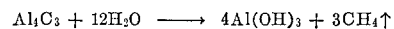

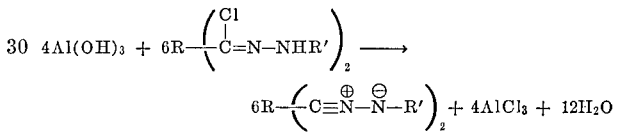

In either case a polyfunctional nitrile imine is formed and it in turn reacts to cross-link the unsaturated polymer. It can be seen from the above equations that water is regenerated during the reaction, thus perpetuating the reaction.

In still other embodiments of this invention the latent base comprises molecular sieve material containing alkaline substance that is displaced by or driven out of the sieve material by water. Molecular sieve material, generally available as a free flowing powder, has an interstitial structure with a high degree of adsorptive affinity for polar molecules. Generally, molecular sieve material consists essentially of crystalline alumino-silicate with a crystal structure of SiO$_4$ tetrahedra and AlO$_4$ tetrahedra that form a cross-linked network with uniform spherical cavities interconnected by uniform openings. Such material is described in the U.S. Pats. Nos. 2,882,243 and 2,882,244, to Milton. Preferred examples of alkaline substance contained in the molecular sieve material under the concepts of this invention include ammonia as well as primary, secondary and tertiary amines. Preferred combinations of alkaline substance and molecular sieve material comprise ammonia and sodium zeolite A (described in the 2,882,243 patent to Milton), primary amine (methylamine, ethylamine, ethylene diamine, and the like) and calicum and magnesium zeolite A (described in the 2,882,-243 patent to Milton), and secondary and tertiary amines (dimethylamine, diethylamine, diethylene triamine, trimethylamine, triethylamine, piperazine, and the like) and sodium zeolite X (described in the 2,882,244 patent to Milton).

A latent base of this kind is made by contacting preferably at 0-25° C. anhydrous finely divided molecular sieve material with anhydrous alkaline substance usually alone, when it is normally liquid, but in solution in a suitable anhydrous solvent when it is normally gaseous or solid. The quantity of alkaline substance, quantity of molecular sieve material and length of time of contacting are selected to obtain a desired concentration of adsorbed alkaline substance in the molecular sieve material. Usually, the preferred maximum concentration of adsorbed alkaline substance in the molecular sieve material is about 15–20% by weight of the molecular sieve material, but higher and lower operable concentrations are within the broader concepts of this invention. Subsequently, excess and unadsorbed alkaline substance, if any, are removed from the molecular sieve material as by washing the material with an anhydrous solvent for the alkaline substance.

A feature sometimes of advantage in employing as latent base material in the practice of this invention molecular sieve material containing alkaline substance is that instead of, or in addition to, moisture initiation of the cross-linking reaction, heat triggering or initiating of the reaction can be employed. Generally speaking, alkaline substance that is displaced or driven out of molecular sieve material by water is also displaced or driven out by heat. Hence, when it is desired to heat trigger the cross-linking reaction, preferably only sufficient heat is applied to the cross-linkable composition to cause exudation of the desired quantity of alkaline substance from the molecular sieve material.

The quantities of the unsaturated polymer, polyfunctional hydrazide halide and latent base in the cross-linkable composition of this invention depend in general upon the degree of cross-linking desired, the nature of the unsaturated polymer, etc. In general, the amount of polyfunctional hydrazide halide employed is in a range of from about 1 to about 30% by weight of the unsaturated polymer, and preferably in a range from about 5 to about 20% by weight of the unsaturated polymer. Concentration of the latent base generally is sufficient to effect conversion of substantially all of the polyfunctional hydrazide halide to the corresponding nitrile imine. Preferably the concentration of the latent base is in excess by about 20 to about 100% of the concentration required on a molecularly equivalent basis to effect conversion of substantially all of the polyfunctional hydrazide halide to the nitrile imine.

The cross-linkable compositions of this invention are made by blending or admixing the materials in any desired fashion, provided that moisture is excluded. For example, the unsaturated polymer and polyfunctional hydrazide halide are dissolved in an anhydrous volatile solvent therefor, and then admixed with the latent base plus any other materials, if any, under an inert anhydrous atmosphere. Thereafter, the solvent is removed under reduced ambient pressure. Of course, particularly when the latent base material comprises molecular sieve material with adsorbed alkaline substance, the blending is carried out preferably at or below 20–25° C.

It may be desired in certain cases to modify the compositions of this invention by prereacting certain of the materials therein. For example, a polyfunctional hydrazide halide of this invention can be treated with sufficient free base to remove approximately half of the hydrogen halide groups. When this treatment is conducted in the presence of the unsaturated polymer, the free nitrile imine groups will add onto the polymer at its double bonds, but the polymer is still not cross-linked. The partially reacted, still unsaturated, polymer containing a plurality of hydrazide halide groups is mixed with a latent base, whereby a composition is obtained which is stable until exposed to moisture. When the composition is contacted by water the remaining hydrogen halide groups are removed and the resulting free nitrile imine groups add on to the remaining double bonds of the polymer and thereby cross-link the polymer chains.

In addition to the unsaturated polymer, polyfunctional hydrazide halide and latent base, other materials can be incorporated into the cross-linkable composition of this invention. Typical materials are fillers such as, for example, carbon black, titanium dioxide, diatomaceous earth, talc, and the like; plasticizers such as phthalates, adipates, sebacates, fatty acid esters of pentaerythritol, fatty acid esters of dipentaerythritol, and the like; stabilizers; adhesive promoters; pigments; and the like. There are embodiments in which other materials are not required or desired, and in such instances excellent results are achieved when only the unsaturated polymer, polyfunctional hydrazide halide and latent base are employed.

As already indicated, the compositions of this invention can be stored for long periods of time. The only requirement of such storage is that the compositions be sealed from moisture and, when latent base material comprises molecular sieve material with heat displaceable alkaline substance, be kept preferably at or below 20–25° C. To initiate cross-linking, the composition need merely be exposed to moisture such as atmospheric moisture. Generally, a non-tacky skin forms in about 2 hours to 3 days from the time of exposure, depending upon the thickness and specific ingredients in the cross-linkable composition.

The compositions of this invention are useful in numerous applications. For example, they can be used as one-component sealants such as caulking compositions which can be extruded into joints from caulking guns, but which do not flow after deposition in the joints, and which cross-link on exposure to moisture. By using a foaming latent base compound, a caulking composition can be prepared that will expand after it is extruded into the joint. Another use is as an adhesive. Compositions of this invention are excellent adhesives for bonding glass, metals, wood, plastics, fabrics, etc. Still another use is as air-dryed coating compositions. Other uses will be apparent to those skilled in the art.

This invention is further illustrated by the following working examples of various aspects of the invention, including preferred specific embodiments of the invention. This invention is not limited to these specific embodiments unless otherwise indicated. All parts and percentages referred to therein are by weight unless specifically noted otherwise.

EXAMPLE 1

This example illustrates the preparation of isophthaloyl-bis(phenylhydrazide chloride).

A solution of 20 parts of isophthaloyl chloride in 300 parts of chloroform is mixed with a solution of 42.5 parts of phenylhydrazine in 150 parts of chloroform over a period of one hour. The mixture is allowed to stand overnight, and the solid reaction mass is then filtered, heated with water to remove salts, and then filtered again. The resulting filter cake is dissolved in a mixture of dimethylformamide and water, and recrystallized to give a product consisting essentially of isophthaloyl-bis (phenylhydrazide). A typical melting point is 269–270° C.

A mixture of 12.2 parts of the isophthaloyl-bis(phenylhydrazide) product, 100 parts of diethyl ether and 17.9 parts of phosphorous pentachloride is refluxed for 21.5 hours. Then 30 parts of phenol in 35 parts of diethyl ether are added, followed by 25 parts methanol. The resulting solution is filtered and the solvent evaporated until crystallization begins. When crystallization is substantially complete, the solid material is recrystallized from a mixture of acetone and water, giving a product consisting essentially of isophthaloyl-bis(phenylhydrazide chloride). A typical melting point is 167.5–168.5° C.

EXAMPLE 2

This example illustrates the preparation of adipoyl-bis(phenylhydrazide chloride).

A solution of 20 parts of adipoyl chloride in 300 parts of chloroform is mixed with a solution of 48 parts of phenylhydrazine in 150 parts of chloroform over a period of one hour. The solid reaction product that forms is filtered, heated with water to remove salts and then filtered again. The filtered reaction product is then recrystallized from a mixture of dimethylformamide and water. The recrystallized product consists essentially of adipoylbis (phenylhydrazide).

A mixture of 10.0 parts of the recrystallized product, 100 parts of diethyl ether and 19.0 parts of phosphorous pentachloride, is refluxed for 24 hours. Then 32 parts of phenol in 35 parts of diethyl ether are added, followed by 25 parts of methanol. The resulting solution is filtered and the solvent evaporated until crystallization begins. When crystallization is substantially complete, the solid product is recrystallized from a mixture of acetone and water. The recrystallized product consists essentially of adipoyl-bis(phenylhydrazide chloride).

EXAMPLE 3

This example illustrates the preparation of trimesoyl-tris(phenylhydrazide chloride).

A solution of 20 parts of trimesoyl chloride in 450 parts of chloroform is mixed with a solution of 50 parts of phenylhydrazine in 200 parts of chloroform over a period of 1.5 hours. A solid reaction product forms. It is filtered, heated with water to remove salts, and then filtered again. The product is dissolved in a mixture of dimethylformamide and water, and recrystallized. The recrystallized product consists essentially of trimesoyl-tris(phenylhydrazide).

A mixture of 10.0 parts of the recrystallized product, 150 parts of diethyl ether and 15.0 parts of phosphorous pentachloride is refluxed for 24 hours. Then 25 parts of phenol in 50 parts of diethyl ether are added, followed by 20 parts of methanol. The resulting solution is filtered and the solvent evaporated until crystallization begins. When crystallization is substantially complete, the solids are recrystallized from a mixture of acetone and water. The product thus obtained consists essentially of trimesoyl-tris(phenylhydrazide chloride).

EXAMPLE 4

This example illustrates the preparation of N,N'-p-phenylene bis(benzoylhydrazide chloride).

A mixture of 10 parts of benzoyl chloride in 100 parts of chloroform, 120 parts of water and 3.0 parts of sodium hydroxide is mixed with a solution of 4.92 parts of p-phenylene bis(hydrazine) in 50 parts of chloroform over a period of one hour. During this period a solid reaction product forms. It is filtered, heated with water, filtered again and then recrystallized from a mixture of dimethylformamide and water. The recrystallized product consists essentially of N,N'-p-phenylene bis(benzoyl hydrazide).

A mixture of 10.0 parts of the recrystallized product, 100 parts of diethyl ether and 15 parts of phosphorus pentachloride is refluxed for 24 hours. Then 25 parts of phenol in 50 parts of diethyl ether are added, followed by 21 parts of methanol. The resulting solution is filtered and the solvent evaporated until crystallization begins. When crystallization is substantially complete, the solids are recrystallized from a mixture of acetone and water. The product thus obtained consists essentially of N,N'-p-phenylene bis(benzoyl hydrazide chloride).

Other acyl and aroyl chlorides which can be reacted with phenylhydrazine or other suitable hydrazines such as, for example, methylhydrazine, ethylhydrazine, cyclohexylhydrazine, benzylhydrazine, and p-tolylhydrazine, to produce the corresponding hydrazides include terephthaloyl chloride, mellitoyl chloride, succinoyl chloride, glutaroyl chloride, malonoyl chloride, and the like. The reaction is carried out preferably at 20–25° C. The resulting hydrazides are subsequently reacted with phosphorous pentachloride to produce the bis(hydrazide chlorides) of this invention. Preferably, the latter reaction is carried out at a temperature of 0–100° C. Suitable diluents other than those named in the preceding example can be used in carrying out these reactions as is readily apparent to those skilled in the art.

EXAMPLE 5

This example illustrates the preparation of a specific cross-linkable polyester composition of this invention.

33.5 parts of anhydrous copolyester made from dimer acid, maleic anhydride, and diethylene glycol, having a molecular weight of about 2700, Acid No. of 50.8, and an Ester No. of 242, and containing 10.3% fumarate ester (calculated as acid) and 4.1% maleate ester (calculated as acid), and 8.4 parts of anhydrous isophthaloyl bis(phenylhydrazide chloride) are dissolved in 50 parts anhydrous tetrahydrofuran. To this solution are added 4.3 parts of finely ground anhydrous barium oxide. The ingredients are mixed well, and the solvent is removed under reduced pressure. The resulting product, typically a yellowish cream, is a cross-linkable polyester composition of this invention.

A sample strip of this product of 1/8-inch thickness is cast and allowed to cure in the open atmosphere (70° F.; 50% humidity). Within two days this sample cures typically to a soft, rubbery solid which is insoluble in tetrahydrofuran. A control sample kept in a closed jar for 4½ months is typically still a soft cream and easily soluble in tetrahydrofuran (except for the barium oxide, which is insoluble in organic solvents).

The creamy product of this example has utility as a sealant.

EXAMPLE 6

This example illustrates a cross-linkable isobutylene-isoprene copolymer composition of this invention and its preparation.

100 parts of an anhydrous isobutylene-isoprene copolymer having a molecular weight of about 10,000 and containing 4 mole percent isoprene, providing about 7 double bonds per polymer chain, and 14 parts of anhydrous isophthaloyl bis(phenylhydrazide chloride) are dissolved in 100 parts of anhydrous tetrahydrofuran. Then 7.5 parts of finely ground anhydrous barium oxide, 30 parts of anhydrous titanium dioxide as filler and 5 parts of anhydrous bentonite clay as thixotropic agent are added. All the ingredients are mixed well. Then the solvent is removed under reduced pressure. The resulting product, typically a white paste, is a cross-linkable composition of this invention.

On exposure to the open atmosphere, films (1/8 to 1/4 inch thick) prepared from this product typically cure to insoluble rubbers within several days. The paste product kept in a tightly closed jar typically is still applicable and uncross-linked after six months.

The cross-linkable paste product of this example has utility as a sealant.

EXAMPLE 7

This example illustrates a cross-linkable vinylated polyether triol composition of this invention and its preparation.

100 parts of anhydrous vinylated polyether triol, made from acetylene and a poly(propylene oxide) adduct of trimethylol propane with a molecular weight of about 4,000 and 15 parts of anhydrous isophthaloyl bis(phenylhydrazide chloride) are dissolved in 100 parts anhydrous tetrahydrofuran. Then the solvent is removed under reduced pressure. Typically the result is a heavy oil.

This oil is mixed with 8 parts of finely ground anhydrous barium oxide, 30 parts of anhydrous carbon black (Sterling R), and 5 parts of anhydrous bentonite clay in a roller type mill until a homogeneous paste product is obtained. This product is a cross-linkable composition of this invention.

A film of 1/8 inch thickness made from this paste product typically cross-links integrally over several days on exposure to the atmosphere. The paste product, however, can be stored in absence of moisture for at least four months without cross-linking.

The cross-linkable paste product of this invention has utility as caulking material.

EXAMPLE 8

This example illustrates a cross-linkable copolymer composition of this invention, and its preparation.

10 parts of an anhydrous polyether triol-toluene diisocyanate-allyl alcohol copolymer having a molecular weight of approximately 5000 and a terminal methylene content of about 0.8% by weight as determined by infrared analysis, 27 parts of a polyether diol-toluene diisocyanate-allyl alcohol copolymer having an approximate molecular weight of 5000 and a terminal methylene content of about 0.8% by weight as ascertained by infrared analysis, and 2.5 parts anhydrous isophthaloyl bis(phenyl hydrazide chloride) are dissolved in 100 parts of anhydrous tetrahydrofuran. The polyether triol-toluene diisocyanate-allyl alcohol copolymer is made by adding a poly(propylene oxide) adduct of trimethylolpropane, which adduct has a molecular weight of about 4000, to toluene diisocyanate at a mole ratio of triol to diisocyanate of 1:3, and then adding allyl alcohol at a mole ratio of alcohol to the triol-diisocyanate addition product of 3:1. The polyether diol-toluene diisocyanate-allyl alcohol copolymer is made by adding a poly(propylene oxide) adduct of 2,3-propylene glycol, which adduct has a molecular weight of about 2000, to toluene diisocyanate at a mole ratio of diol to diisocyanate of 2:3, and then adding allyl alcohol at a mole ratio of alcohol to the diol-diisocyanate addition product of 2:1. To the tetrahydrofuran solution of the two copolymers and the bis(hydrazide chloride) are added 0.2 parts of finely ground aluminum carbide, 10 parts of anhydrous, finely divided, carbon black and one part of bentonite clay. The reaction mixture thus formed is mixed well, and then the solvent is removed under reduced pressure. The resulting product is typically a black, heavy paste. This product is a cross-linkable composition of this invention.

Under exclusion of moisture, this paste product generally can be stored for six months without cross-linking. A sample, exposed to the open atmosphere as a ⅛ inch thick film, typically cross-links overnight to an insoluble rubber while at the same time expanding in thickness to ¼ inch to ⅜ inch. A cross cut through the film typically reveals numerous small cells, the methane liberated by the action of the moisture on the $Al_4C_3$ having foamed the composition.

The cross-linkable paste product of this example has utility as a sealant.

EXAMPLE 9

This example illustrates a cross-linkable propylene oxide-allyl glycidyl copolyether composition of this invention, and it preparation.

100 parts of anhydrous propylene oxide-allyl glycidyl copolyether having a molecular weight of about 12,000 and containing 97 mole percent propylene oxide and 3 mole percent allyl alycidyl ether, and 10 parts of anhydrous isophthaloyl bis(phenylhydrazide chloride) are dissolved in 100 parts of anhydrous tetrahydrofuran. Then 30 parts anhydrous titanium dioxide and 5 parts anhydrous bentonite clay are added. After the ingredients are mixed well, the solvent is removed under reduced pressure. A heavy paste typically results.

In a roller type mill under exclusion of moisture this paste is blended at 20–25° C. with 20 parts of ethylene diamine charged molecular sieve material, the molecular sieve material being calcium and magnesium zeolite A having an effective opening size of about 5 A. and containing ethylene diamine at a concentration of about 10% of the calcium and magnesium zeolite A.

The resulting paste product is a cross-linkable composition of this invention.

The product typically remains unchanged during three months' storage under exclusion of moisture; a sample (as a film of ⅛ inch thickness) exposed to the open atmosphere typically cross-links integrally in one day.

The cross-linkable unsaturated polymer product of this example has utility as a sealant.

EXAMPLE 10

This example illustrates another cross-linkable composition of this invention, and its preparation.

171 parts of poly(propylene oxide) triol-poly(propylene oxide) diol-toluene diisocyanate-allyl alcohol copolymer and 6 parts of N,N'-p-phenylene bis(benzoyl hydrazide chloride) are dissolved in 200 parts of anhydrous tetrahydrofuran. The copolymer is made by reacting a propylene oxide adduct of 2,3-propylene glycol, which adduct has a molecular weight of about 2000, with toluene diisocyanate at a mole ratio of adduct to diisocyanate of 3:6, then reacting with the adduct-diisocyanate reaction product a poly(propylene oxide) adduct of trimethylolpropane, which latter adduct has a molecular weight of about 4000, the mole ratio of the latter adduct to the reaction product being about 1:3 and then reacting with the resulting reaction product allyl alcohol at a mole ratio of alcohol to the resulting reaction product of 3:1. Following formation of the tetrahydrofuran solution, the solvent is removed by evaporation under reduced ambient pressure. The residue is an oil. The oil is mixed on a roller type mill with 4 parts of finely divided ground barium oxide, 40 parts anhydrous titanium dioxide and 5 parts bentonite clay. When the mixture has become homogeneous, it is removed from the mill. This is the desired product. It can be stored in the absence of moisture for several months to a year and during this time it typically does not cross-link. On the other hand, a film of ⅛" thickness upon exposure to the open atmosphere typically cures integrally over a period of 2 days.

The cross-linkable unsaturated polymer product of this example has utility as a sealant.

EXAMPLE 11

This example illustrates another cross-linkable polyether composition of this invention, and its preparation.

171 parts of the triol-diol-diisocyanate-allyl alcohol copolymer described in Example 10, and six (6) parts of adipoyl-bis(phenyl hydrazide chloride) are dissolved in 100 parts of anhydrous tetrahydrofuran. To the resulting solution are added 4 parts of finely ground barium oxide, 45 parts of anhydrous carbon black and 5 parts of anhydrous bentonite clay. The tetrahydrofuran solvent is then removed by evaporation under reduced ambient pressure. The residue is typically a heavy paste. This paste is milled in a roller type mill until homogeneous. The homogeneous paste is the desired product.

The product can be stored for more than a year in the absence of moisture without cross-linking. On the other hand, a film of ⅛" thickness upon exposure to atmospheric moisture cures integrally within 48 hours.

The cross-linkable paste product of this example has utility as a sealant.

EXAMPLE 12

This example illustrates still another specific cross-linkable polyether composition of this invention, and its preparation.

127 parts of a polyether diol-toluene diisocyanate-allyl alcohol copolymer having an approximate molecular weight of 12,700, and 9 parts of trimesoyl bis(phenyl hydrazide chloride) are dissolved in 100 parts of anhydrous tetrahydrofuran. The copolymer is made by reacting a poly(propylene oxide) adduct of 2,3-propylene glycol, which adduct has an approximate molecular weight of 2000, with toluene diisocyanate at a mole ratio of diol to diisocyanate of 3:4, followed by reacting allyl alcohol and the diol-diisocyanate reaction product at a mole ratio of alcohol to reaction product of 2:1. After formation of the solution, the tetrahydrofuran is removed by evaporation under reduced ambient pressure. The residue typically is a medium to heavy oil. To this oil are added 7.5 parts of finely ground barium oxide, 30 parts of anhydrous titanium dioxide and 3 parts of anhydrous bentonite clay. The resulting mixture is milled on a roller type mill until it is homogeneous. The homogeneous mixture is the desired product.

The product can be stored in the absence of moisture for several months to a year without its becoming cross-linked. On the other hand, a ⅛″ thick film made from this paste typically cures integrally during two days exposure to the open atmosphere.

The cross-linkable paste product of this example has utility as a sealant.

Thus, this invention provides cross-linkable unsaturated polymer compositions, the cross-linking or cure of which is moisture initiated. The cross-linked polymer compositions of this invention are hard, tough rubbers which are substantially insoluble in water and hydrocarbon solvents. They exhibit improved tensile properties over their uncured counterparts. These polymer compositions are useful in various rubber applications such as, for example, protective and decorative coatings for various substrates including wood, metals, paper and plastics, as ingredients of tires for motor vehicles, of tubing, of pipe and of other rubber articles, and the like.

Other features, advantages and specific embodiments of this invention will be readily apparent to those in the exercise of ordinary skill in the art after reading the foregoing disclosures. These specific embodiments are within the scope of the claimed subject matter unless otherwise indicated. Moreover, while specific embodiments of this invention have been described in considerable detail, variations and modifications of these embodiments can be effected without departing from the spirit and scope of the claimed subject matter.

What I claim and desire to protect by Letters Patent is:

1. A process for cross-linking and foaming an unsaturated polymer, which comprises exposing to atmospheric moisture said polymer in intimate admixture with a latent base and a polyfunctional hydrazide halide having the formula selected from the group consisting of

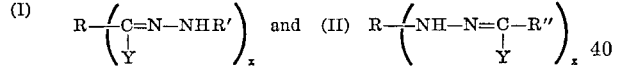

wherein R is an organic radical having a valence greater than 1, R′ is selected from the group consisting of the hydrogen and monovalent hydrocarbon radicals, R″ is a monovalent hydrocarbon radical, Y is a halide radical, and x is an integer equal to the valence of R, said latent base comprising a compound which reacts with moisture to form a gas.

2. A cross-linkable composition comprising (1) an unsaturated polymer, (2) aluminum carbide, and (3) a polyfunctional hydrazide halide having the formula selected from the group consisting of

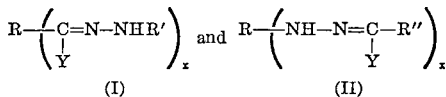

wherein R is an organic radical having a valence greater than 1, R′ is selected from the group consisting of the hydrogen and monovalent hydrocarbon radicals, R″ is a monovalent hydrocarbon radical, Y is a halide radical, and x is an integer equal to the valence of R.

References Cited

UNITED STATES PATENTS

| | | | |
|---|---|---|---|
| 3,418,285 | 12/1968 | Breslow | 260—88.3 |
| 3,442,849 | 5/1969 | Tashlick et al. | 260—47(EPC) |

FOREIGN PATENTS

| | | | |
|---|---|---|---|
| 882,738 | 11/1961 | Great Britain | 260—2(MS) |

MURRAY TILLMAN, Primary Examiner

W. J. BRIGGS, SR., Assistant Examiner

U.S. Cl. X.R.

260—2, 40, 75, 77.5, 85.3, 91.3